US008817669B2

(12) United States Patent
Walker et al.

(10) Patent No.: US 8,817,669 B2
(45) Date of Patent: Aug. 26, 2014

(54) METHOD AND APPARATUS FOR MANAGING TELEPHONE CALLS

(75) Inventors: Craig Elliott Walker, Danville, CA (US); Vincent Paquet, San Jose, CA (US); Donnie Carlton Fletcher, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/822,099

(22) Filed: Jun. 23, 2010

(65) Prior Publication Data

US 2010/0322392 A1 Dec. 23, 2010

Related U.S. Application Data

(63) Continuation of application No. 11/785,659, filed on Apr. 19, 2007, now abandoned.

(51) Int. Cl.

| | |
|---|---|
| ***H04L 12/16*** | (2006.01) |
| ***H04B 1/44*** | (2006.01) |
| ***H04M 11/00*** | (2006.01) |
| ***H04M 1/64*** | (2006.01) |
| ***H04M 15/00*** | (2006.01) |
| ***H04M 3/42*** | (2006.01) |
| ***H04L 29/06*** | (2006.01) |

(52) U.S. Cl.

CPC ........ *H04L 65/1076* (2013.01); *H04L 65/1096* (2013.01); *H04L 65/40* (2013.01); *H04M 3/42127* (2013.01); *H04M 3/42017* (2013.01)

USPC ..... 370/271; 370/282; 379/88.18; 379/88.25; 379/133; 379/211.02; 379/212.01

(58) Field of Classification Search

CPC ..................... H04L 29/06197; H04L 65/1006; H04M 1/2535; H04M 1/663; H04M 3/42; H04M 3/42017; H04M 3/42229; H04M 3/4285; H04M 3/436; H04M 3/533; H04M 3/53391

USPC .......... 370/271, 282; 379/88.22, 133, 142.01, 379/88.18, 134, 140, 211.02, 211.03, 379/212.01

See application file for complete search history.

(56) References Cited

U.S. PATENT DOCUMENTS 5,159,592 A 10/1992 Perkins
5,321,740 A 6/1994 Gregorek et al.

(Continued)

FOREIGN PATENT DOCUMENTS

WO WO 02/079984 A 10/2002

OTHER PUBLICATIONS www.ringcentral.com, 1999-2007, Ring Central, Inc.
International Search Report dated Sep. 30, 2008.

(Continued)

*Primary Examiner* — Un C Cho
*Assistant Examiner* — Jeremy Costin

(57) ABSTRACT

A system and method for managing telephone calls is disclosed. The system includes a central controller that receives and processes telephone calls. The identity of a caller is first determined. Based on predetermined settings designated by an end user, a call is directed to one or more telephones of the end user. Preferably, the end user's telephones ring simultaneously. The user may answer any of his/her telephones and choose from among several options of how to handle the call. If the user chooses to answer the call, the call may be transferred to that telephone and the conversation may commence.

14 Claims, 7 Drawing Sheets

(56) References Cited

U.S. PATENT DOCUMENTS

| | | | | |
|---|---|---|---|---|
| 5,428,670 | A | 6/1995 | Gregorek et al. | |
| 5,457,680 | A | 10/1995 | Kamm et al. | |
| 5,497,339 | A | 3/1996 | Bernard | |
| 5,539,886 | A | 7/1996 | Aldred et al. | |
| 5,550,816 | A | 8/1996 | Hardwick et al. | |
| 5,675,507 | A | 10/1997 | Bobo, II | |
| 5,742,905 | A | 4/1998 | Pepe et al. | |
| 6,005,870 | A | 12/1999 | Leung | |
| 6,073,165 | A | 6/2000 | Narasimahn et al. | |
| 6,104,711 | A | 8/2000 | Voit | |
| 6,208,638 | B1 | 3/2001 | Rieley et al. | |
| 6,233,317 | B1 | 5/2001 | Homan | |
| 6,282,574 | B1 | 8/2001 | Voit | |
| 6,308,070 | B1 | 10/2001 | Laster | |
| 6,350,066 | B1 | 2/2002 | Bobo, II | |
| 6,359,880 | B1 | 3/2002 | Curry et al. | |
| 6,564,321 | B2 | 5/2003 | Bobo, II | |
| 6,587,458 | B1 | 7/2003 | Burg | |
| 6,597,688 | B2 | 7/2003 | Narasimahn et al. | |
| 6,625,258 | B1 | 9/2003 | Ram | |
| 6,625,642 | B1 | 9/2003 | Naylor | |
| 6,683,870 | B1 | 1/2004 | Archer | |
| 7,020,132 | B1 | 3/2006 | Narasimahn et al. | |
| 7,024,457 | B1 | 4/2006 | Newman et al. | |
| 7,092,498 | B2 | 8/2006 | Hariri | |
| 7,194,079 | B1 | 3/2007 | Straub | |
| 7,248,577 | B2 | 7/2007 | Hakusui | |
| 7,257,201 | B2 | 8/2007 | Singh | |
| 7,379,543 | B2 | 5/2008 | Hariri | |
| 7,440,565 | B2 | 10/2008 | McLarty et al. | |
| 7,610,384 | B1 | 10/2009 | Schulzrinne | |
| 7,680,256 | B2 | 3/2010 | McLarty et al. | |
| 2002/0111990 | A1 | 8/2002 | Wood et al. | |
| 2002/0137490 | A1 | 9/2002 | Gallant | |
| 2003/0187655 | A1* | 10/2003 | Dunsmuir | 704/270 |
| 2004/0114747 | A1* | 6/2004 | Trandal et al. | 379/211.02 |
| 2004/0218733 | A1* | 11/2004 | Chin et al. | 379/67.1 |
| 2004/0218734 | A1* | 11/2004 | Gilbert et al. | 379/76 |
| 2004/0258220 | A1* | 12/2004 | Levine et al. | 379/88.23 |
| 2005/0069097 | A1 | 3/2005 | Hanson | |
| 2005/0074109 | A1 | 4/2005 | Hanson | |
| 2005/0100152 | A1* | 5/2005 | Pearson | 379/207.16 |
| 2005/0152521 | A1* | 7/2005 | Liljestrand | 379/201.03 |
| 2005/0204002 | A1* | 9/2005 | Friend | 709/206 |
| 2005/0213740 | A1* | 9/2005 | Williams et al. | 379/211.02 |
| 2005/0278366 | A1* | 12/2005 | Horvitz et al. | 707/100 |
| 2006/0093121 | A1* | 5/2006 | Sylvain | 379/220.01 |
| 2006/0210033 | A1* | 9/2006 | Grech et al. | 379/88.19 |
| 2007/0121590 | A1* | 5/2007 | Turner et al. | 370/352 |
| 2008/0107244 | A1* | 5/2008 | Setzer et al. | 379/88.12 |
| 2008/0192655 | A1 | 8/2008 | Vagelos | |
| 2008/0192656 | A1 | 8/2008 | Vagelos | |
| 2008/0192657 | A1 | 8/2008 | Vagelos | |
| 2008/0192904 | A1 | 8/2008 | Vagelos | |
| 2008/0207176 | A1* | 8/2008 | Brackbill et al. | 455/413 |
| 2009/0310771 | A1 | 12/2009 | Vagelos | |
| 2012/0113872 | A1* | 5/2012 | McLarty et al. | 370/259 |

OTHER PUBLICATIONS

ATT Personal Reach Service dated Mar. 29, 2010.

ATT Personal Reach Benefits and Features dated Mar. 29, 2010.

Lennox, Jonathan, Services for Internet Telephony, Columbia University, 2004.

Schulzrinne, Hennging, et al., The Session Initiation Protocol: Providing Advance Telephony Services Across the Internet, Bell Labs Jrn., Oct.-Dec. 1998.

Singh, Kundan, et al, Cinema: Columbia InterNet Extensible Multimedia Architecture, Dept of Sci., Columbia University.

* cited by examiner

METHOD AND APPARATUS FOR MANAGING TELEPHONE CALLS

REFERENCE TO RELATED APPLICATION

This application is a continuation of U.S. patent application Ser. No. 11/785,659, filed on Apr. 19, 2007, now abandoned which claims priority to International Application No. PCT/US2008/005118 filed on Apr. 21, 2008, all of which are incorporated herein by reference in their entirety.

FIELD OF THE INVENTION

The present invention relates generally to call processing and, more particularly, to a system, method, and computer program product for processing and managing communications over network based servers operating over IP protocols.

BACKGROUND OF THE INVENTION

Voice telephony and communications today is generally provided to subscribers via the public switched telephone network (PSTN), wireless communications networks, and the Internet, which can carry telephone calls between PSTN gateways, from end user to end user, or between an end user on the Internet and an end user on the PSTN or wireless network.

The process of setting up telephone calls for the PSTN is well known and has used "out of band" communication over the SS7 ("Signaling System 7"). Generally, SS7 signaling uses a network and protocol that is separate from the network over which voice traffic flows and is used to control switches, such as an AT&T ESS #4 switch, in circuit switched networks. Additional protocols have been used for the routing of voice data over the Internet, including International Telecommunications Union H.323 Internet protocol and the Session Initiation Protocol (SIP).

Call processing features, such as call forwarding, have been made available to PSTN subscribers via SS7 control protocols, and separately to wireless subscribers and VOIP providers. In addition, the PSTN has been used to provide one number telephone routing, pursuant to which a single telephone number is used to reach a subscriber at one of several telephones. Toll free calling has also incorporated call routing to multiple telephone number based on time of day and other features.

Systems in the prior art have attempted to provide call processing features. Each of these prior systems, however, have many disadvantages and/or deficiencies. Generally, the prior art does not generally allow customization down to the individual caller level. For instance, a system provided by Ring Central, found at www.ringcentral.com, provides call processing features. Ring Central, however, does not allow settings for each web call to be customized. Moreover, ring back tones cannot be uploaded for use with their system. Importantly, calls cannot be recorded, either in their entirety or at a time selected by the user. The prior art systems also fail to remember the identify of a caller who has previously called. Thus, a caller is forced to identify themselves each time they call, which causes a significant inconvenience.

Moreover, Ring Central and other prior art systems do not allow a call to be switched to other phones designated by a user. Though the systems often provide voicemail capabilities, they do not allow a user to eavesdrop on a voicemail message while it is being left, or to join in with the caller leaving a voicemail. In addition, prior art systems fail to allow text to speech screening.

However, there remains a need for systems and methods to provide a comprehensive communications solution to a subscriber to enable the subscriber to manage communications via separate subscriber accounts through a single portal and to take advantage of data networks and real time protocols using data networks to the maximum extent possible in managing communications. There is still a further need for systems and methods to interface with the PSTN and other networks through gateways that allow management of control of routing through those networks for the convenience of subscribers with accounts on one or more of such networks.

SUMMARY OF THE INVENTION

According to the present invention, a subscriber uses a single telephone number and servers accessible through an Internet portal to manage the routing of communications among separate communications networks. This is accomplished through a communications system that exchanges communications, such as calls, pursuant to real time protocols with other networks, including the PSTN, wireless networks and VOIP networks, and that exchanges control signals with those same networks through a control protocol, such as the session initiation protocol (SIP). The communications systems and methods described herein allow the routing of inbound calls to a single telephone number outbound to one or more of the following: a voicemail database; a PSTN telephone number; multiple PSTN telephone numbers; wireless telephone numbers; VOIP telephone numbers; and other addresses. In addition, a caller may initiate an outbound call from the system via the Internet portal to connect one of the subscriber's telephones to a destination telephone.

According to one embodiment of the present invention, a system for processing calls includes: a database including configuration information and authentication information for users; an inbound controller coupled to an inbound gateway and the database that exchanges first control signals over a session initiation protocol (SIP) with a communications gateway that generates second SIP control signals based on information in the first control signals and the configuration and authentication information; a voicemail database that stores and retrieves communications; a routing controller that prompts callers for information and instructions; an outbound communications controller coupled to an outbound gateway that exchanges fourth control signals with the outbound gateway and communications via a real time protocol with the outbound gateway in order to send the inbound communications outbound over at least one communications network. The system further includes a switch coupled to the inbound controller, the inbound and outbound communications gateways, the voicemail database and the routing controller. The switch may receive the inbound communications over a real time protocol from the inbound gateway, exchange the second control signals with the inbound controller, and route inbound communications based on the second control signals and the routing controller to at least one of the following destinations: the voicemail database; and at least one communications network by sending outbound communications via a real time protocol and exchanging third control signals with the outbound controller, including routing information relating to the outbound communications.

According to various embodiments, the switch may route the inbound communications to the voicemail database and to at least one telephone on at least one of the communication networks. In addition, the routing controller may include a state machine coupled with a script database, which stores a configurable script used to issue voice prompts to a caller at one end of one of the inbound communications system for information pertaining to the handing of that inbound communication.

According to another embodiment, the present invention comprises a method for processing calls. The method includes operatively connecting a switch to an inbound controller, an inbound gateway, an outbound controller, and an outbound gateway. First control signals may then be exchanged over a session initiation protocol (SIP) between the inbound gateway and the inbound controller based on inbound communications to generate second SIP control signals based on information in the first control signals and configuration and authentication information. The switch preferably receives inbound communications over a real time protocol from the inbound gateway, and the second control signals are exchanged with the inbound controller. Fourth forth control signals are also exchanged between the outbound controller and the outbound gateway via a real time protocol in order to send the inbound communications outbound over at least one communications network. Finally, inbound communications are routed based on the second control signals and the routing controller to at least one of: (i) a voicemail database; or (ii) at least one communications network by sending outbound communications based on the inbound communications to the outbound controller via a real time protocol and exchanging third control signals with the outbound controller, including routing information relating to the outbound communications.

According to another aspect, the present invention comprises a method for processing calls. The method preferably includes receiving a call from a caller at an origination point on a first network, and then exchanging communications signals between the first network and a second network using a session initiation protocol. Preferably, the communications signals at the second network are processed using configuration and authentication information. The method also includes determining at least one destination point from a group of destination points based on the processing and directing the communications signals to the at the at least one destination point and, prior to connecting the caller and the user, notifying a user of the call from the origination point.

In one embodiment, the notifying step comprises allowing the user to select from the following options: (i) accept the call; (ii) send the call to a voicemail database; (iii) accept the call and record the call in a database; or (iv) send the call to the voicemail database and simultaneously listen to the call. It may be desirable to allow the call to be directed to two or more destination points substantially simultaneously. Optionally, an audible response is sent to the origination point based on the configuration information and authentication information. The audible response includes at least one of: a song (or other MP3); and a voice recording.

It may be desirable for the group of destination points to comprise a group of telephones.

A user may accept the call on at least one telephone after being notified, and preferably the user has the option to notify each of the telephones within the group of telephones of the call. The call may be transferred from a first telephone to a second telephone when the second telephone indicates acceptance of the call. Alternately, the at least one destination point comprises a voicemail database. The voicemail database preferably stores audio data, and is operable to convert the audio data into text data. The text data stored in the voicemail database is searchable.

According to another embodiment, a graphical representation of data in the voicemail database is displayed on a webpage. The graphical representation includes at least some of: the name of a caller; the time of the call; the date of the call; a duration of the voicemail; and the location of the caller. Preferably, the voicemail database is arranged based on a predetermined order selected by the user. To allow increased accessibility, the database may be accessible from a remote location. Optionally, a user can select a link on the webpage that connects a telephone selected by the user to the caller. The user can accept the call and selectively record at least a portion of the call.

According to another aspect, the present invention comprises another method for processing calls. The method includes receiving a call from a caller at an origination point on a first network, and then exchanging communications signals between the first network and a second network using a session initiation protocol. The communications signals at the second network are preferably processed using configuration and authentication information. Two or more destination points from a group of destination points are also determined based on the processing. Then, a signal is sent to each of the two or more destination points substantially simultaneously. A user input determines which of the destination points a communication is established with. A user at the one selected destination point is then presented with identifying information about the caller and a plurality of options for handling the call. If the user chooses to accept the call, the user is allowed to transfer the call by providing an input that re-initiates the sending step.

In one embodiment, the present invention queries a first time caller for their identity. Thereafter, the present invention is operable to store the identity of the caller in a memory. This feature prevents the caller from having to identify themselves each time they call. Instead, the callers identity, e.g., their name, can be provided to the user. If a first time caller's number is already in the user's address book, the present invention will not ask the caller for their identity. Instead, the present invention will read the caller's name from the user's address book, e.g., using a text to speech feature. Preferably, the caller preferably hears an audio file pre-selected by the user after the processing step. The plurality of options for handling the call include at least one of: sending the call to a voicemail database and listening in on the voicemail as it is being recorded; or accepting the call and simultaneously recording the call. If the user selects the option of listening in on the voicemail, the user can selectively terminate the voicemail and begin communicating with the caller by providing an input. Alternately, the user can send the call to a voicemail database, and the contents of the voicemail database, e.g., duration of a call, name of the caller, telephone number of the caller, are displayed on a webpage. It may be desirable for the order of the voicemails displayed on the webpage to be customized by the user. If, however, the user chooses to accept the call after the presenting step, the user can selectively record at least a portion of the call into a database.

According to yet another aspect, the present invention comprises a computer program product for use in a call processing system. The system includes a computer readable medium and computer program instructions, recorded on the computer readable medium, executable by a processor, for implementing a call processing system. The call processing system includes the steps of receiving a call from a caller at an origination point on a first network and exchanging communications signals between the first network and a second network using a session initiation protocol, and processing the communications signals at the second network using configuration and authentication information.

Two or more destination points from a group of destination points are then determined based on the processing, and then a signal is sent to each of the two or more destination points substantially simultaneously. A communication is then established with one selected destination point based on a user input, and a user at the one selected destination point is presented with identifying information about the caller and a plurality of options for handling the call. If the user chooses to accept the call, the user can transfer the call by providing an input that re-initiates the sending step.

BRIEF DESCRIPTION OF THE FIGURES

Further features and advantages of the invention can be ascertained from the following detailed description that is provided in connection with the drawings) described below.

DETAILED DESCRIPTION OF THE PREFERRED EMBODIMENTS

Figure 1:
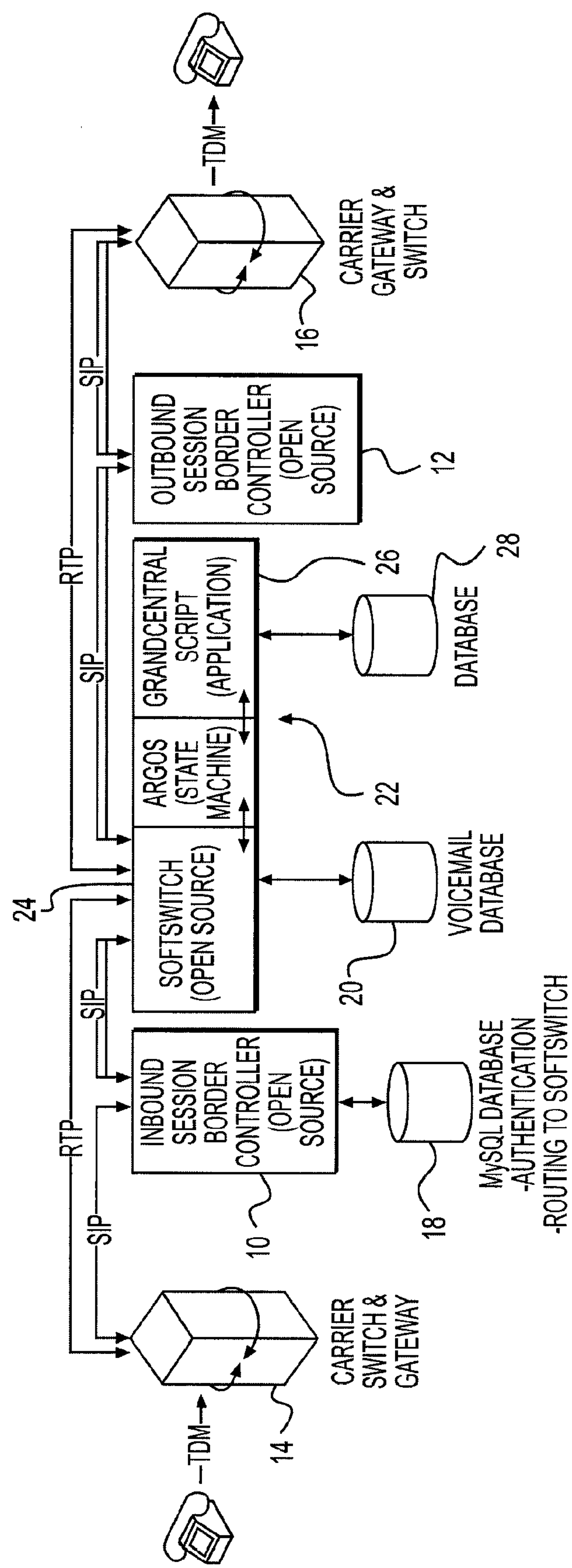
FIG. 1 is a block diagram showing an overview of one embodiment of the present invention.

A drawback of existing telephone systems, whether switch or packet based, is that the calls may only be routed to one destination. That is, it has a single point of origination, and a single destination. In an increasingly mobile society, existing telephone systems simply fail to provide the accessibility that consumers desire. To overcome this and other disadvantages, the present invention comprises a system for processing calls. The system allows, for example, a call to be routed to one, or even multiple, destinations. In addition, the system allows the calls to be filtered and manipulated in a variety of manners discussed below in detail.

System Architecture

According to one aspect, the present invention may employ a variety of types of hardware and software. The software may be written in any computer language known to those skilled in the art. Moreover, combinations of different languages may be used, such as C, FORTRAN, JAVA, HTML, and the like.

The hardware that may be used in combination with the present invention includes processors, memory, e.g., random access memory (RAM) and read-only memory (ROM), flash memory, and the like, and input devices, e.g., a keyboard, mouse, and the like. The present invention may also include a display device, e.g., a screen, and routers and switches. The different hardware is preferably operatively connected. According to one aspect, the hardware may be enclosed within a housing, such as a computer or the like.

In alternate embodiments, the present invention may also include any computer readable medium, including, but not limited to, a computer disk, a CD-ROM, flash memory, RAM, ROM, or any other computer readable medium known to those skilled in the art. It is desirable for the computer readable medium to include computer program instructions recorded thereon. A processor is preferably operable to execute the computer program instructions in order to implement the present invention.

In one embodiment, the present invention uses a combination of hardware and software to route a call from a first network, e.g., a traditional switch based network, e.g., the PSTN, over a packet based network, e.g., the Internet. Skilled artisans will recognize, however, that a call may originate from any type of network. For instance, in another embodiment a call may originate from a wireless network, e.g., a cellular or satellite based network. Alternately, the call may originate from a packet based network, e.g., the Internet, using a communications apparatus that employs Voice over Internet Protocol (VOIP). Regardless of the origin of the call, it is preferably routed to a packet based network, unless it originates from the packet based network, as mentioned above. From the packet based network, the call may be directed to several different endpoints, preferably simultaneously. The endpoints may reside on a switch based network, a packet based network, or even a wireless network, e.g. a cellular telephone network or a satellite based network.

FIG. 1 is a block diagram showing an overview of one exemplary embodiment of the present invention. In one embodiment, the system includes an inbound controller 10 that is operatively connected to a packet based network. The inbound controller 10 may comprise a session border controller (SBC). It may be desirable for the SBC to utilize open source software, although other types of proprietary software may be used. The system also includes a substantially similar outbound controller 12 that functions in a substantially similar manner.

The inbound controller 10 may be operatively connected to an inbound gateway 14. The inbound gateway 14 is preferably operatively connected to both a switch based network and the packet based network. These gateways, which are well known to those skilled in the art, preferably function as an interface between the switch based network and the packet based network, and allow signals to pass between the two. A similar outbound gateway 16 may be operatively connected to a switch based network at another point. The outbound gateway 16 may also be operatively connected to the outbound controller 12 in order to route communications signals to a desired destination.

As shown in FIG. 1, the present invention also includes a database 18 that includes configuration and authentication information for users. The database 18 preferably includes a variety of configuration information. The configuration information may be used, for example, to determine where to route a particular call. The routing of a call may be based on many factors known to skilled artisans, such as the eventual destination of the call, where the call originated, network traffic, open routers or switches, and the like.

The database 18 also includes authentication information, which allows the present invention to filter authorized callers from unauthorized callers. For instance, in one aspect of the present invention it may be desirable to direct authorized calls directly to a user, while unauthorized, or unrecognized calls are directed to an operator. Alternately, the authentication database 18 allows calls to be filtered so that calls that are designated as undesirable, e.g., telemarketers, can be prevented from reaching an intended recipient.

Calls may also be filtered based on their phone number. That is, a user may pre-select how they want the system to handle a call from a particular phone number. When that phone number attempts to reach the user, it is then handled in the desired manner. A user may also designate two or more phone numbers into a group. The user may then predetermine how they want all of the calls in a particular group to be handled. For instance, it may be desirable to group all telephone numbers from a user's family into a "family" group whose calls and voicemails may be customized or prioritized.

The system also includes provisions for diverting calls when a user is unavailable. According to one aspect, the diversion is implemented using a voicemail database 20. The database 20 preferably stores data, e.g., voice data, in a digital format. When desirable, a user may access the database 20 using a packet based network, a switch based network, or a wireless network.

It is preferable for the inbound controller 10 and inbound gateway 14 to be operatively connected to a central controller 22. The central controller 22 may prompt callers for information and instructions, e.g., their name, purpose of the call, etc. The central controller 22 may also be operable to receive the inbound communications over a real time protocol from the inbound 14 and outbound gateways 16. Then, the central controller 22 may exchange control signals with the inbound controller 10 in order to route the inbound communications based on these control signals.

In one embodiment, the central controller 22 preferably includes a switch 24, e.g., a softswitch. The central controller 22 also preferably includes a routing controller 26 and may optionally include an additional database 28 to which information may be stored, and from which information may be retrieved. According to one aspect, the central controller 22 preferably communicates with the inbound 10 and outbound controllers 12 using the session initiation protocol (SIP). According to other embodiments, however, the present invention may also be used in combination with User Datagram Protocol (UDP), Transmission Control Protocol (TCP), Asynchronous Transfer Mode (ATM), and the like.

As mentioned above and illustrated in FIG. 1, the central controller 22 may direct communications signals to one, or multiple destinations. In one aspect, the communications signals (and thus the call) are directed to at least one of two destinations. The first possible destination may be the voicemail database 20. The second destination may be a communications network such as a switch based network, a packet based network, or a wireless network. The second destination is determined by sending outbound communications based on the inbound communications to the outbound controller 12, preferably via a real time protocol (RTP). In doing so, control signals are exchanged with the outbound controller 12, including routing information relating to the outbound communications.

Exemplary Features of the Present Invention

According to one aspect, the system described above allows the present invention to implement various features. Several exemplary features according to one aspect of the present invention are described below. These features are not intended to limit the present invention in any way, and represent a sample of the many features that may be implemented in conjunction with the system of the present invention. Additional features known to those skilled in the art, either alone or in combination with the features described below, may be implemented as desired.

Record/Read On the Fly

According to one embodiment, a user may record a telephone conversation at any time during the conversation. The recording may be started, stopped, and restarted at any time. The recording of the conversation is preferably stored on a database of the present invention. The specific database chosen may vary. In one embodiment, however, a database operatively connected to the central controller may be used. If a user is talking on a telephone, it is desirable for the recording to be started and stopped by having the user provide an input using a specific button, e.g., the four key "4" on a touch tone keypad.

Customized Ring Tones On Ring Back

One embodiment of the present invention may include the ability to customize the ring tone that is audible to the caller (aka ring back tone). That is, a user may designate a particular song, tone, or other audible signal that should be played for a caller. Thus, when a designated caller dials a user's phone number, the caller will hear the ring back tone that has been selected for them by the user. The ring back tone may include a recording, e.g., a user's voice, or it may include a song. Various ring tones, preferably in MP3 format, may be chosen or uploaded to the system of the present invention. It is desirable for ring back tones to be selected for each individual caller that a user designates. In the event that a ring back tone has not been selected for a caller, a default ring back tone may be selected. According to another embodiment, the present invention also allows a customized ring back tone to be assigned on a group basis. Thus, a user may define two or more telephone numbers as belonging to a particular group. The user may then select a desired ring back tone to be played anytime a caller from that group attempts to reach the user.

The present invention does not have to be limited to one ring back tone for each caller or group of callers. The user may select two or more back ring tones that can be played for a particular caller. A ring back tone may be randomly selected from the group of two or more ring back tones when the particular caller or group of callers attempts to reach the user. Optionally, the ring back tones may be played for the caller in a predetermined order selected either by the user or a computer program that automatically selects one of the group of ring back tones to be played.

Selective Screening

It is desirable for a user to be able to select from several options for routing an incoming call. To begin, the incoming call is held at the central controller. The central controller may then call the telephones designated by the user. When a user answers the telephone of their choice, they are presented with the identity of the caller and several options for handling the call. For instance, according to one embodiment, a call can be screened in one of four ways. First, a user may choose to accept a call, in which case the call will be routed to the telephone that the user answered. If the user chooses not to accept the call, they may choose to send the call directly to voicemail. In this scenario, the central controller routes the call directly to voicemail. A call may also be routed directly to voicemail if a user chooses not to answer any of the phones they have designated, or a user may set a rule that all calls from a particular caller are routed directly to voicemail, in which case the designated phones of the user may not ring at all.

It is also preferable for the user to have other options for screening a call. A third option may be, for example, to accept the call and record it. As mentioned above, of course, the recording may be started and stopped at any time. However, by selecting this option the call will be recorded as soon as it is initiated. A caller may later stop the recording if desired. The user may also choose to send the call to voicemail, and simultaneously eavesdrop on the voicemail. Using this option, a user may hear the message that the caller is leaving on the voicemail, but the caller may not hear the user. One advantage of this option is that a user may determine the importance of the call, and whether or not they would like to speak with the caller. If, by listening to the voicemail as it is being recorded, the user determines that they want to speak to the caller, the present invention allows the user to cut into the call and speak with the caller. A caller may predetermine whether they want the voicemail recording to end when they decide to cut into a call. This feature may be implemented, for example, by requiring the user to press a specific button, e.g., the star key "*," in order to cut into the call. Skilled artisans will recognize that a variety of methods may be used to cut into the call. For instance, other buttons or combinations of buttons, voice commands, and the like may be used to implement this feature.

Call Switch Between Phones

It is often desirable to switch a call from one phone to another. The phones may be located on the same, or different networks. This feature is advantageous if, for example, a user is talking on their cellular telephone, and they want to transfer the call to their home telephone. Using the system of the present invention, a user can implement the call transfer feature by taking a specified action, e.g., pushing a button on a touch tone pad of their telephone. When the feature is implemented, each of the other designated telephones will ring. While the other telephones are ringing, the call is preferably still connected to the telephone on which the user was originally talking. When another designated telephone is answered, the call may then be disconnected from the original telephone, e.g., the cellular telephone, and transferred to the new telephone, e.g., the home telephone.

In an alternate embodiment, the call does not have to be connected to the original telephone, e.g., the cellular telephone, when the feature is implemented. That is, when the feature is implemented by the user, the call may be disconnected from that telephone. The other designated telephones may then ring, and the user may choose which phone to answer. When the user answers the new telephone, e.g., the home telephone, the call may be connected to that telephone.

Voicemail

As discussed above, the present invention includes a voicemail database. One embodiment of the present invention includes the ability to manipulate the voicemails stored on the database in a variety of ways. One feature of the present invention allows the voicemails to be fast forwarded, rewound, paused, or stopped. A user may also designate a priority for each caller, and their related voicemail. Thus, if a caller knows that a particular caller is a high priority, they may designate the caller as such. Then, when the high priority caller leaves one or more voicemails, they will be played before other voicemails that are of a lesser priority to a user.

This feature of the present invention is particularly advantageous when a user is accessing their voicemail from a telephone because it prevents a user from having to sort through and listen to multiple voicemails that may not be important to the user. The voicemails may be "ranked" according to any desired criteria. Examples of criteria that may be used to rank voicemails include, but are not limited to, the frequency of the calls, the importance of a caller, voicemails designated urgent by a caller, and the like. Using this feature of the present invention, a user can quickly access their voicemail box and any high priority voicemails without delay. As will be recognized by skilled artisans, multiple tiers of priority may be predetermined by a user. Any voicemails stored in the database may then be played back to the user in that order.

Figure 2:
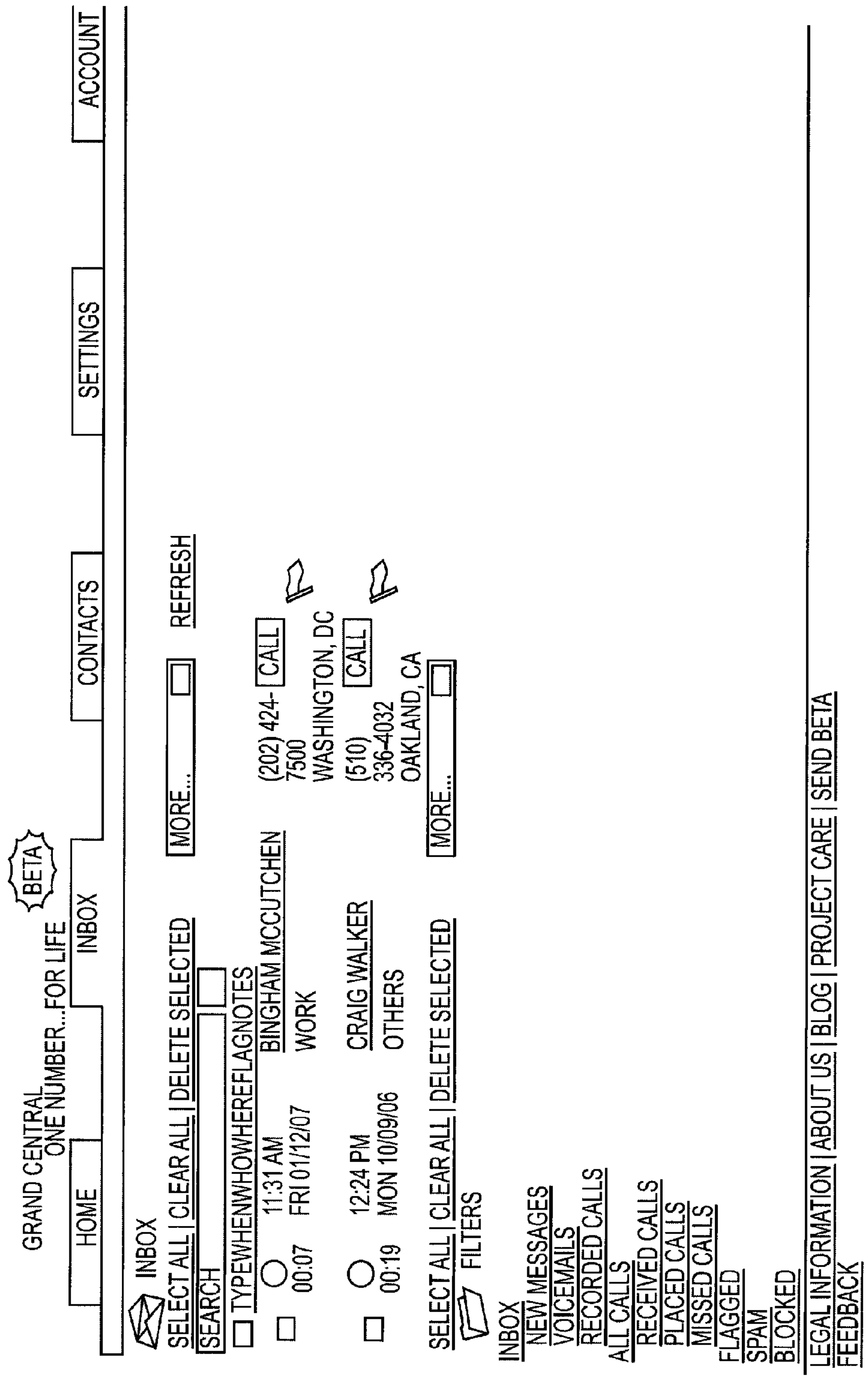
FIG. 2 is a diagram showing an exemplary webpage according to one aspect of the present invention.

The present invention also includes the ability to access voicemails via a webpage, as shown in FIG. 2. The webpage preferably presents a list of voicemails and provides identifying information, such as the callers name, timestamp, date, phone number, duration of the voicemail, city in which the call originated (by area code), and the like. The voicemails may optionally listed in a desired order, for example, by the time they were recorded, by date, according to predetermined groups, and the like. In this manner, a user may view the entirety of his/her voicemails and select which ones they want to listen to.

Figure 3:
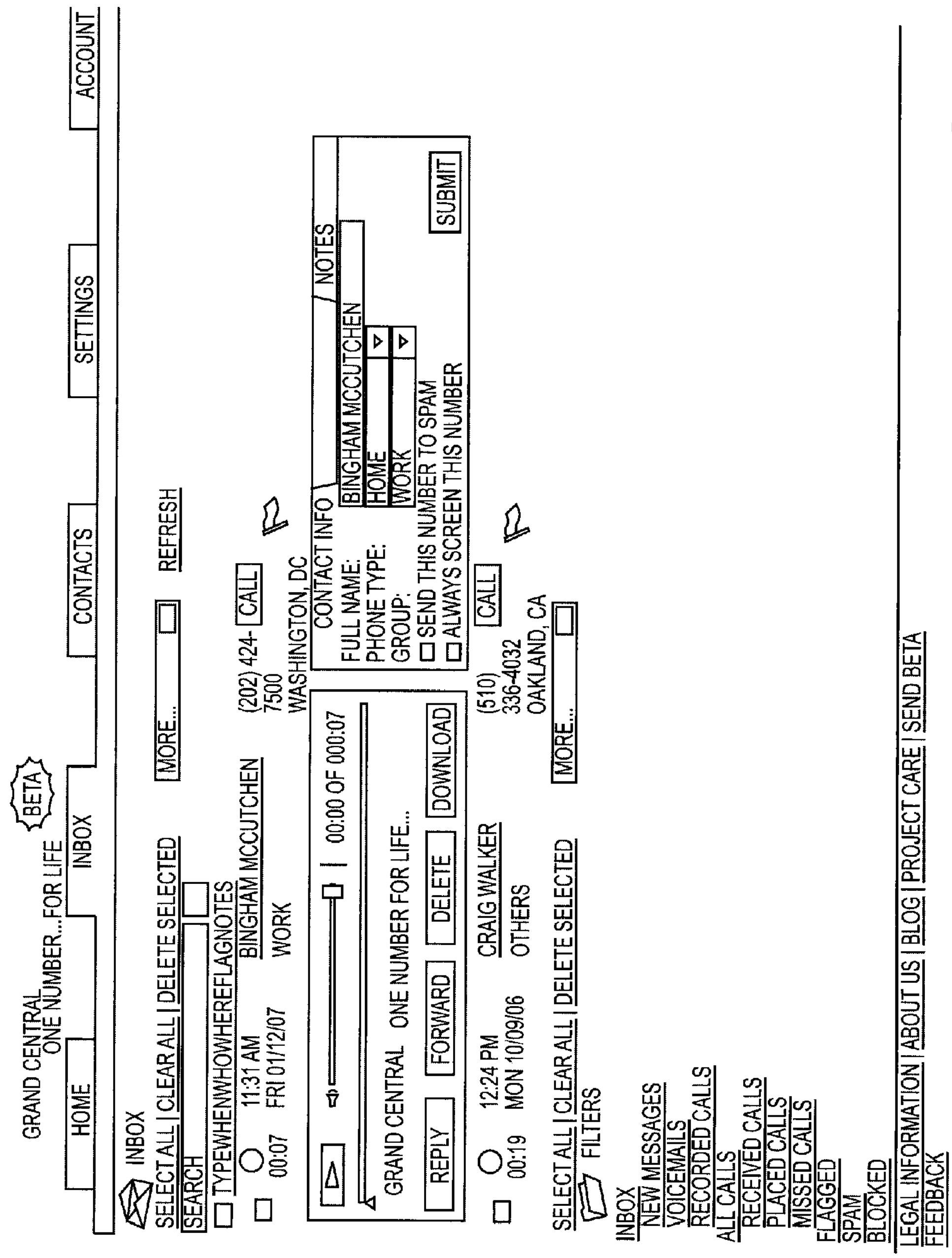
FIG. 3 is a diagram showing another exemplary webpage according to one aspect of the present invention.

In one embodiment, a user may listen to a voicemail by selecting or "clicking" on a link within the webpage. After selecting the link, the voicemail will begin to play, as illustrated in FIG. 3. When a user has finished listening to the voicemail, they may close the voicemail and return to the list. The voicemails may be saved, deleted, forwarded, and the like. One advantage of the present invention is that the voicemails are stored in a voicemail database that is preferably operatively connected to the central controller 22. The links to the voicemails provided on the webpage do not forward a copy of the voicemail itself. Rather, the link plays the voicemail directly from the database. Even when a voicemail from the webpage is forwarded to another person, the link still plays the voicemail directly from the database. In this manner, a user may delete a voicemail from the database in order to prevent it from being accessed by anyone who has a copy of the link. In other words, anyone who has a copy of the link will be prevented from listening to the voicemail after a user has deleted it from the database.

According to another aspect of the present invention, the voicemail database may also include a transcript of each voicemail. This may be implemented using any speech to text software and/or hardware known to those skilled in the art. The voicemail transcript may then be searchable, e.g., by keyword. This may be useful to professionals, such as lawyers and doctors, who need to accurately recall the contents of a conversation or voicemail.

Figure 4:
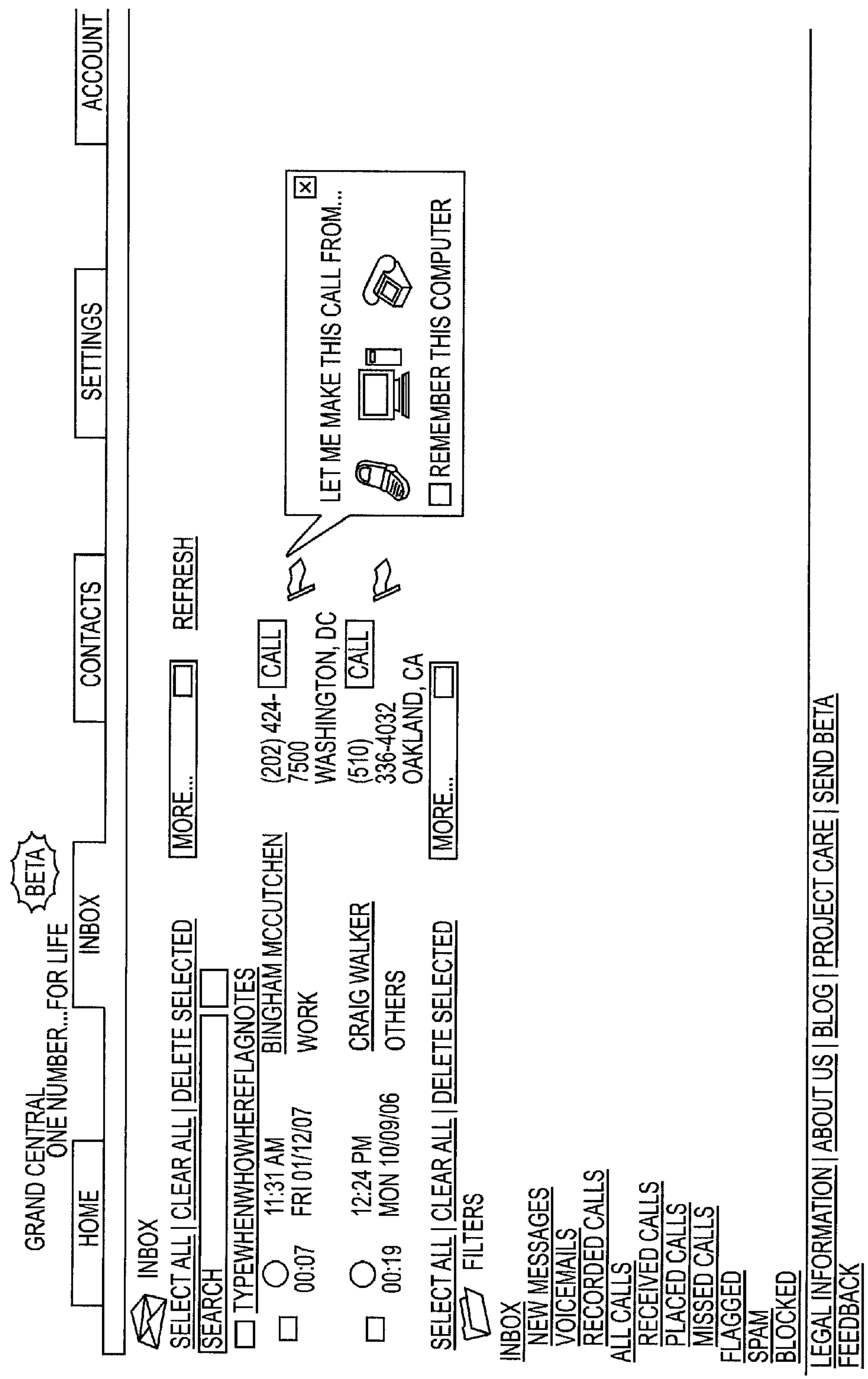
FIG. 4 is a diagram showing yet another exemplary webpage according to one aspect of the present invention.
Figure 5:
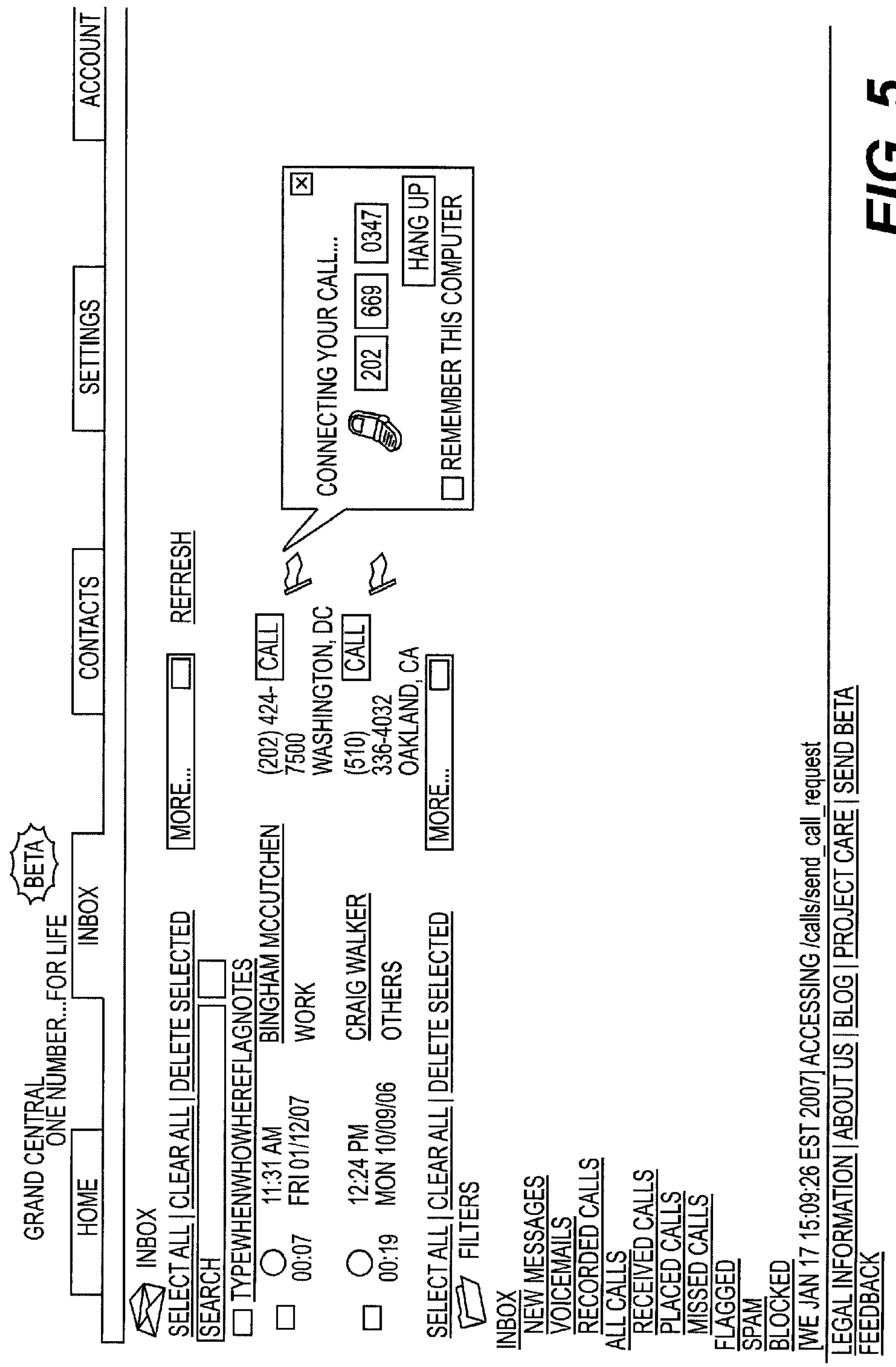
FIG. 5 is a diagram showing still another exemplary webpage according to one aspect of the present invention.

In another embodiment, a voicemail may be forwarded to another person so that they can access the voicemail at any time. This is preferably implemented by forwarding the code that accesses the voicemail database. The code may comprise a link, e.g., a HTML link, that may be cut and pasted into an email or webpage. Those skilled in the art will recognize that the code is message specific, i.e., each voicemail has a unique code that only allows access to that particular voicemail. The present invention also preferably includes the ability to return a call from the webpage listing of voicemails. As shown in FIG. 2, the voicemail includes a "call" button that may be selected by "clicking" on it. When a user selects the call feature, a popup appears that allows a user to make the call from one of the user's designated telephones, or another undesignated telephone number, as shown in FIG. 4. Once the user selects which telephone they would like to place the call from, the system of the present invention initiates a call with caller, as shown in FIG. 5. The selected phone will then ring, and the callers phone will also ring.

It may be desirable for the user's phone to ring first, with the caller's phone ringing after the user has picked up their own phone. This may prevent a caller from picking up the phone before the user has picked up their phone. Alternately, both phones may ring substantially simultaneously to reduce the delay in connecting the call. If the caller picks up before the user picks up, the caller may be presented with a recording that asks them to wait for the user to be connected.

Customized Treatment of Callers

The present invention includes the ability to customize the way a caller is treated. Thus, a user may set up a series of rules for each caller. As discussed above, a user may set up a ring tone or specific message that a caller hears when they dial the user's number. In addition, the user may set up a specific voicemail greeting for each user. Moreover, a user may select the telephones that ring when a specific user calls. For instance, a user may want all of his/her designated phones to ring when his/her boss calls. However, when a call is received from the user's friend, the user may only want the call to go to his/her cellular telephone, or alternately, directly to voicemail during business hours. In this manner, the present invention allows each aspect of the call, from the ring back tone, to the phones to which a call is directed, to the voicemail greeting, to be customized for each individual caller.

Calls Multiple Numbers Simultaneously

The system of the present invention preferably allows a call to be directed to multiple destinations, if desirable to a user. As such, when a phone call is received by the system of the present invention, it determines the user's preferences for a particular call based on the identity of the originating phone number. After determining which numbers to direct an incoming phone call to, each of the destination phones preferably begin to ring at the substantially same time. During the time that the destination phones are ringing, the caller is not connected to any of these numbers. Rather, the call is held at the central controller 22 until a user answers one of their designated phones. The call remains at the central controller 22 until the user selects how they would like the call to be handled, e.g., accept the call, send the call to voicemail, accept the call and record, or eavesdrop on the voicemail. The present invention is not intended to be limited to calling any number of phones, i.e., it may call as many phones as desired simultaneously.

Spam Filter

A user may designate certain calls as unwanted, or spam, and choose not to have them delivered to their phones under any circumstances. Alternately, a user may choose to only accept numbers that they know, rejecting all others. The undesirable numbers may be directed directly to voicemail, or a recording may be played to the caller stating that the user has chosen not to accept calls from unknown users. Additionally, the system maintains a database of all numbers designated as spam and provides the ability for a user to have all community designated spam callers go directly to voicemail.

Web Call Button

The system of the present invention preferably allows a user to copy a section of HTML code to be placed on any website in order to create a button which may initiate phone calls between a person and the user. Any person who clicks on such a button will be prompted to enter their name and phone number and the system will call them and then call the user at the numbers designated for such button. Each such button can have custom ringback tones selected, custom phones to ring, and custom voicemail greetings to be played.

The Exemplary Method

According to one aspect, the method of the present invention is implemented using the exemplary system described above. According to another aspect, the present invention comprises a business method for routing data that is also implemented using the exemplary system described above. In one embodiment, the business method may be implemented using a computer. These exemplary methods according to the present invention are described in detail below.

Figure 6:
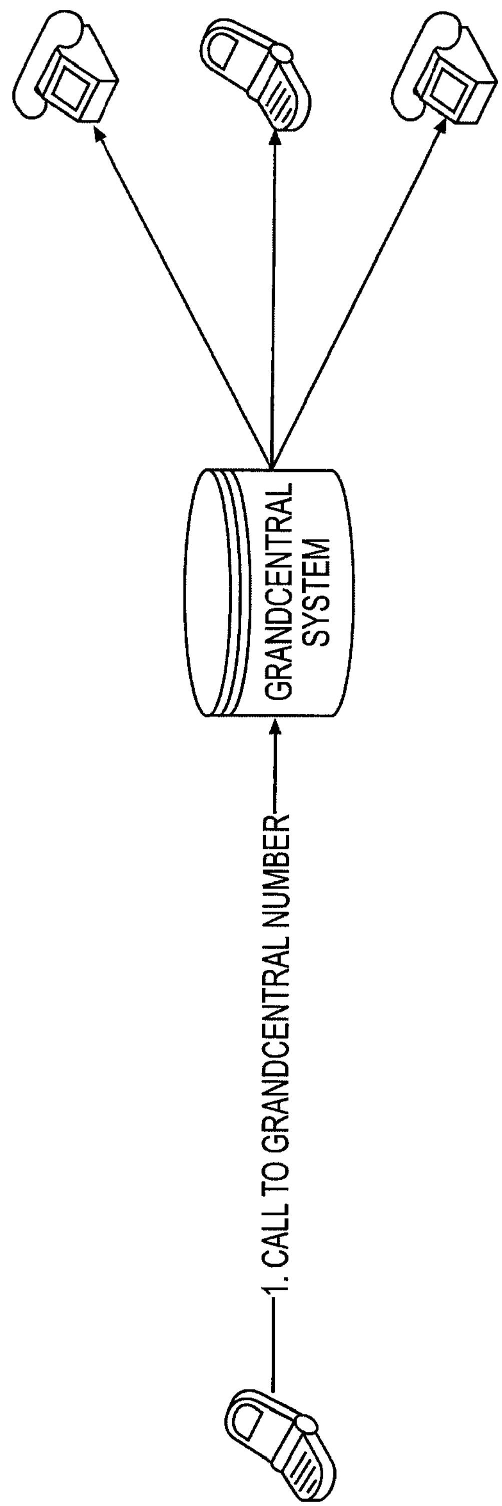
FIG. 6 is another diagram showing an overview of one embodiment of the present invention.

A general block diagram of the exemplary system is shown in FIG. 6. Generally, a user initiates a call by dialing a recipient's phone number. The call, as described above, may initiate from any communications network, such as switch based network, packet based network, or wireless network. As shown in FIG. 6, a caller places a call and it is routed to the system of the present invention. Once the call reaches the system of the present invention, it may be directed to one or more destinations simultaneously. One advantage of the present invention is that calls may be routed to multiple destinations on similar or different networks, e.g., packet based networks, switch based networks, or wireless networks, substantially simultaneously.

Figure 7:
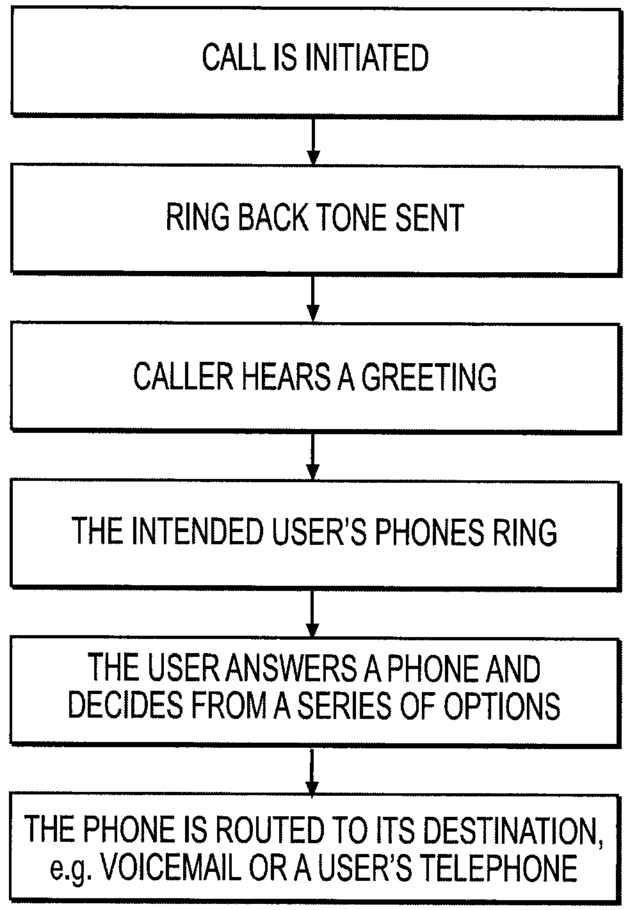
FIG. 7 is a flow chart showing exemplary steps according to one aspect of the present invention.

FIG. 7 is a flow chart showing exemplary steps according to one aspect of the present invention. When a call first reaches the system of the present invention, the system automatically screens the call based on its automatic number identification (ANI). After determining the origin of the call, various steps may be implemented. Once the caller is identified, the caller receives a default or customized ring back tone, depending on the user's settings. If the caller is not recognized, the system answers the phone, and plays a message that asks the caller to state his/her name. Once again, the message may be customized. In the absence of a customized message, a default message may play. After the message is played, the system will play the ringback tone selected for such group of callers.

In an alternate embodiment, the present invention may determine that the call is a facsimile, text message, or other non-voice data that is being transmitted to the user. In this case, the facsimile or text message may be stored in a document, e.g., a PDF document, and forwarded to the user's email address. In the case of text messages, the system may forward that text message to any or all of the users' text enabled forwarding phones and also handle return messages sent through the system. The transcript of this communications may be maintained by the current system for future reference, user lookup, etc.

At substantially the same time, the system preferably determines whether the originating number has been listed as spam, e.g., a telemarketer, or they may have chosen to specifically block the number from being received. If the call has not been blocked by a user, the system determines which designated numbers to call. When the user answers the phone, the identity of the caller may be announced to the user. If the identity of the caller cannot be determined, i.e., if the caller is not in the user's address book, the phone number or other associated ANI information, e.g., the name that the phone is registered to, may be presented to the user. Alternately, the user may be prompted to provide their name, which may be recorded. The recorded name may then be presented to the user when they answer one of their designated telephones. Subsequently, the user may then choose among several options, such as accepting the call, sending the call to voicemail, accepting the call and recording it, or listening in on the voicemail.

If the user opts to accept the call, or accept it and record it, the caller and the user are connected and a conversation may commence. If the user opts to send the call to voicemail, the caller will hear a voicemail greeting, which may or may not be customized, and the caller may then record their message. Users that choose to send the call to voicemail while listening in may listen to the voicemail as it is being recorded. If at any time they decide they want to interrupt the voicemail to speak with the caller, they may do so by activating the talk feature. The feature may be activated in any manner known to those skilled in the art, such as by providing an input, e.g., pressing a button on a touch tone pad. When the feature is activated, the voicemail recording may be terminated. Alternately, the voicemail may continue while the conversation continues.

Although the invention has been described with reference to particular embodiments, it will be understood to those skilled in the art that the invention is capable of a variety of alternative embodiments within the spirit of the appended claims. Therefore, it will be understood that the appended claims are intended to cover all such modifications and embodiments which come within the spirit and scope of the present invention.

For instance, the present invention as described above may be used in combination with any type of data, including text messages, facsimiles, graphics, e.g., pictures, and the like. The present invention is preferably operable to determine which type of data is being transmitted by a user. If a person is attempting to transmit a text message to a user, it is desirable for the present invention to recognize that a text message is being transmitted. The present invention may then route the text message to an end destination, e.g., a cell phone, that is designated by a user. If, for example, a facsimile is being transmitted to a user, the present invention preferably stores the facsimile in a database for later retrieval by the user.

Regardless of the type of data transmitted to the user, the present invention may notify the user of the receipt of the data. The notifications may be in any manner known to those skilled in the art, e.g., the user may receive an indication that a message has arrived by having an icon displayed on their cellular telephone. The user may also pre-select which end destinations a particular type of data, e.g. text messages, facsimiles, graphics, can receive a particular type of data. A telephone on the PSTN, for example, is typically not configured to receive text messages or graphics. Thus, a user can select options that direct these types of messages to only their cellular phone. Alternately, the data may be stored as a message that is accessible by the user via the Internet.

What is claimed is:

1. A system for processing calls to called users, comprising:

an inbound controller, coupled to an inbound gateway coupled to a public switched telephone network (PSTN), capable of authenticating inbound calls received in a session initiation protocol (SIP) format using authentication information to filter authorized callers from unauthorized callers such that authorized calls are directed directly to a called user of the called users, while unauthorized or unrecognized calls are directed elsewhere;

an outbound controller, coupled to an outbound gateway coupled to the PSTN, capable of sending the authenticated SIP calls to an outbound gateway;

a voicemail database, coupled to a central controller, capable of storing and retrieving communications and designating by the called users, a priority for each caller and their related voicemail so that a voicemail from high priority callers will be played before voicemail from lesser priority callers;

the central controller, coupled to the inbound and outbound gateways, capable of sending and receiving the authenticated SIP calls and associated real time protocol (RTP) signals as inbound calls and routing the inbound calls to the called users based on each called user's telephone number, and further being capable of: (i) routing a current one of the inbound calls received from a caller to the called user simultaneously to multiple destination points, including points on the PSTN, configured by the called user; (ii) playing audible information to the caller on the current one of the inbound calls; (iii) establishing communication with the called user at an answered one of multiple destination points; (iv) after communication is established at the answered one of multiple destination points, allowing the called user to select from options for the current inbound call including (a) accepting the current inbound call, (b) sending the current inbound call to the voicemail database, (c) connecting the current inbound call to the voicemail database and listening to the inbound call, wherein the central controller is further configured to allow the called user to select an option to accept the current inbound call while the caller is connected to the voicemail database and further configured to allow the called user to select whether a voicemail recording ends when the current inbound call is accepted while the caller is connected to the voicemail database and whether the voicemail recording continues when the current inbound call is accepted while the caller is connected to the voicemail database, and (d) sending the current inbound call to another telephone.

2. The system according to claim 1, further comprising:

the central controller being configured to allow the called user to select an option to accept the current inbound call and record the current inbound call.

3. The system according to claim 1, further comprising:

the central controller being configurable to prompt the caller for identity, and thereafter each time the caller calls the called user from the same telephone number, providing the caller's identity to the called user without further information being provided by the caller.

4. The system according to claim 1, wherein the central controller is configured to store in the voicemail database at least the following voicemail data for each of the inbound calls sent to the voicemail database: audio from each caller, each caller's telephone number, each caller's name, and a duration of stored audio for each of the inbound calls and further wherein the called user is capable of retrieving information for each of the inbound calls in the voicemail database.

5. The system according to claim 1, further comprising:

the central controller being configurable to allow the called user to select the audible information played to each caller based on an identity of each caller.

6. A computer program product for processing calls to called users, comprising a non-transitory computer readable medium, including computer program instructions, recorded on the non-transitory computer readable medium, executable by a processor, for processing the calls, the computer program instructions including:

a call processing module, executable by the processor, capable of sending and receiving calls in a session initiation protocol (SIP) format to gateways to a public switched telephone network (PSTN), the call processing module capable of authenticating inbound calls received in a session initiation protocol (SIP) format using authentication information to filter authorized callers from unauthorized callers such that authorized calls are directed directly to a called user of the called users, while unauthorized or unrecognized calls are directed elsewhere;

a voicemail module, executable by the processor, capable of storing and retrieving communications from the calls in a voicemail database and designating by the called user, a priority for each caller and their related voicemail so that a voicemail from high priority callers will be played before voicemail from lesser priority callers;

a central controller module, executable by the processor, capable of sending and receiving the authenticated SIP calls and associated real time protocol (RTP) signals as inbound calls and routing the inbound calls to the called users based on each called user's telephone number, and further being capable of: (i) routing a current one of the inbound calls received from a caller to the called user simultaneously to multiple destination points including points on the PSTN configured by the called user; (ii) playing audible information to the caller on the current one of the inbound calls; (iii) establishing communication with the called user at an answered one of the multiple destination points; (iv) after communication is established at the answered one of multiple destination points, allowing the called user to select from options for the current inbound call including (a) accepting the current inbound call, (b) sending the current inbound call to the voicemail database, (c) connecting the current inbound call to a the voicemail database and listening to the inbound call, wherein the central controller is further configured to allow the called user to select an option to accept the current inbound call while the caller is connected to the voicemail database and further configured to allow the called user to select whether a voicemail recording ends when the current inbound call is accepted while the caller is connected to the voicemail database and whether the voicemail recording continues when the current inbound call is accepted while the caller is connected to the voicemail database, and (d) sending the current inbound call to another telephone.

7. The computer program product system according to claim 6, further comprising:

the central controller module executable by the processor further being configured to allow the called user to select an option to accept the current inbound call and record the current inbound call.

8. The computer program product according to claim 6, further comprising:

the central controller module executable by the processor further being configurable to prompt the caller for their identity, and thereafter each time the caller calls the called user from the same telephone number, providing the caller's identity to the called user without further information being provided by the caller.

9. The computer program product according to claim 6, wherein the central controller module executable by the processor is further configured to store in the voicemail database at least the following voicemail data for each of the calls sent to the voicemail database: audio from each caller, each caller's telephone number, each caller's name, and a duration of stored audio for each of the calls and, further wherein the called user is capable of retrieving information for each of the calls in the voicemail database.

10. A method for processing calls to called users, comprising:

authenticating at a computing device coupled between an inbound gateway connected to a public switched telephone network (PSTN) and an outbound gateway coupled to the PSTN, inbound calls received in a session initiation protocol (SIP) format using authentication information to filter authorized callers from unauthorized callers such that authorized calls are directed directly to a called user of the called users, while unauthorized or unrecognized calls are directed elsewhere;

the computing device sending the authenticated SIP calls to the outbound gateway;

storing and retrieving communications in a voicemail database at a the computing device and designating by the called user, a priority for each caller and their related voicemail so that a voicemail from high priority callers will be played before voicemail from lesser priority callers;

sending and receiving by the computing device via the inbound and outbound gateways the authenticated SIP calls and associated real time protocol (RTP) signals as inbound calls, routing by the computing device the inbound calls to the called users based on each called user's telephone number, and further: routing a current one of the inbound calls received from a caller to the called user simultaneously to multiple destination points, including points on the PSTN, configured by the called user; playing audible information to the caller on the current one of the inbound calls; establishing communication with the called user at an answered one of the multiple destination points; after communication is established at the answered one of multiple destination points, allowing the called user to select from options for the current inbound call including accepting the current inbound call, sending the current inbound call to the voicemail database, connecting the current inbound call to the voicemail database and listening to the inbound call, wherein the central controller is further configured to allow the called user to select an option to accept the current inbound call while the caller is connected to the voicemail database and further configured to allow the called user to select whether a voicemail recording ends when the current inbound call is accepted while the caller is connected to the voicemail database and whether the voicemail recording continues when the current inbound call is accepted while the caller is connected to the voicemail database, and sending the current inbound call to another telephone.

11. The method according to claim 10, further comprising:

allowing the called user to select an option to accept the current inbound call and record the inbound call.

12. The method according to claim 10, further comprising:

prompting the caller for identity, and thereafter each time the caller calls the called user from the same telephone number, providing the caller's identity to the called user without further information being provided by the caller.

13. The method according to claim 10, further comprising:

storing in the voicemail database at least the following voicemail data for each of the inbound calls sent to the voicemail database; audio from each caller, each caller's telephone number, each caller's name and a duration of stored audio for each of the inbound calls; and further wherein the called user is capable of retrieving information for each of the inbound calls in the voicemail database.

14. The method according to claim 10, further comprising:

allowing the called user to select the audible information played to each caller based on an identity of each caller.

* * * * *